United States Patent [19]

Harbin

[11] Patent Number: 5,362,111
[45] Date of Patent: Nov. 8, 1994

[54] ANTI-ROTATION LOCKING DEVICE FOR PREVENTING SEPARATION OF COUPLING NUTS FROM FLUID LINES

[75] Inventor: Thomas E. Harbin, Westminister, Calif.

[73] Assignee: VSI Corporation, Chantilly, Va.

[21] Appl. No.: 125,823

[22] Filed: Sep. 24, 1993

[51] Int. Cl.⁵ ............................................. F16L 55/00
[52] U.S. Cl. ................................... 285/92; 285/330; 285/906; 411/121; 411/198
[58] Field of Search .................... 285/80, 92, 117, 902, 285/330, 906; 411/120, 121, 198

[56] References Cited

U.S. PATENT DOCUMENTS

| | | | |
|---|---|---|---|
| 716,204 | 12/1902 | De Waldo | 285/80 X |
| 1,120,228 | 12/1914 | Newton | 285/92 |
| 3,859,692 | 1/1975 | Waterman et al. | 285/117 X |
| 3,874,713 | 4/1975 | Myers | 285/902 X |
| 4,346,734 | 8/1982 | Frank | 411/121 X |
| 4,927,187 | 5/1990 | Sanford et al. | 285/80 |
| 5,094,491 | 3/1992 | Berghammer et al. | 285/330 X |
| 5,222,768 | 6/1993 | Hofa et al. | 285/92 X |

FOREIGN PATENT DOCUMENTS 492340  9/1938  United Kingdom ............... 411/198

Primary Examiner—Dave W. Arola
Attorney, Agent, or Firm—Irving Keschner

[57] ABSTRACT

A spring clip having two apertured end portions. In the preferred embodiment, the first end portion has an unidirectional clutch formed into the aperture wall, or face. The second end portion provides an aperture wall formed to provide an anti-rotation feature. In one embodiment, the clip is used with fluid adapters, the second end portion face having a serration and shape which raises the serration above the parent material to mate with the serration in the upper portion of the adapter lockring. The second end portion has different shapes depending upon the spring clip application.

10 Claims, 7 Drawing Sheets

ANTI-ROTATION LOCKING DEVICE FOR PREVENTING SEPARATION OF COUPLING NUTS FROM FLUID LINES

BACKGROUND OF THE INVENTION

1. Field of the Invention

The present invention provides an inexpensive device for preventing the loosening of coupling nuts on fluid lines.

2. Description of the Prior Art

Fittings for providing a leak-proof attachment between a hydraulic or other fluid conducting tube and associated hardware such as actuators, manifolds, etc. are well known. Examples of such fittings are disclosed in U.S. Pat. No. 3,702,707 to Rosan, Sr.

Various techniques have been proposed to fix the torquing coupling nut, or B-nut, relative to the fitting so that the B-nut does not back off the fitting. For example, a lockwire, passed through holes formed in the B-nut and secured to a boss on the parent material, is used in the '707 patent fittings to accomplish this result.

In co-pending application Ser. No. 430,317, filed Oct. 31, 1989 and assigned to the assignee of this application, other techniques for fixing the B-nut relative to the fitting are disclosed. In particular, a separate sleeve having a shape conforming to the outer configuration of the B-nut slides over the B-nut down to the parent material so that the sleeve engages both the B-nut and the lockring embedded in the parent material.

The disadvantage of using a lockwire to fix the B-nut relative to the fitting is that it is cumbersome and requires drilling a hole in one or more corners of the B-nut and finding a boss or tie-down location on the parent material to keep the B-nut from backing off. The lockwire is not a positive mechanical locking device and installation of lockwires may be subject to inconsistent techniques. The sleeve, and the various modifications thereto, disclosed in the co-pending application require retrofitting to existing systems to be fully effective, such as modifications to the B-nut.

Four patents developed during a patentability search, U.S. Pat. Nos. 3,329,190, 4,708,555 and 5,090,855 and German Patent 2413760 all relate to lockwashers and are designed to prevent the loss of locking torque in a conventional nut and bolt clamp-up. U.S. Pat. No. 1,066,761, also developed during the search, utilizes a modified coil spring and two special clutches and requires a special tool to disengage the coil spring from the clutch. These devices are not designed for coupling components in fluid currents.

U.S. Pat. No. 5,058,930 to Schlosser discloses a high pressure coupling and utilizes a cylindrical arrangement of spaced fingers on a thin wall cylinder having protruding tips directed radially inward, the tips being accommodated in associated annular grooves to prevent disconnection of the coupling component from the associated fluid circuit. Although this coupling component is designed to prevent disconnection as noted above, the complexity thereof, the resultant higher costs and the lack of a retrofit capability makes alternate designs more desirable.

What is desired therefore, is to provide an inexpensive device for preventing the loosening of coupling nuts on air or hydraulic lines from the fitting and which can easily be retrofit to existing installations.

SUMMARY OF THE PRESENT INVENTION

The present invention provides a flexible anti-rotation device having two apertured end portions. In the preferred embodiment, the first end portion has a unidirectional clutch formed in the aperture wall, or face. The second end portion has an aperture wall, or face, formed to provide an anti-rotation feature. In one embodiment, the device is used with fluid adapters, the second end portion face having a serration and shape which raises the serration above the parent material to mate with the serration in the upper portion of the adapter lockring. The second end portion aperture face can be modified to accommodate other uses of the device. In an alternate embodiment, the first end portion has a face shaped to engage a corresponding surface formed on the coupling member in anti-rotation configurations.

The anti-rotation device of the present invention is designed for use with standard coupling nuts wherein the nut face does not contact the surface of the parent material or a washer and prevents further loosening and catastrophic separation of a hydraulic line from its fitting should the initial torque be lost or never applied.

The device incorporates a U-shaped flat spring into which are coined two faces to prevent rotation of the fitting and the coupling nut relative to each other. The spring tension of the compressed U-shaped spring (clip) is utilized to keep the faces engaged with the fitting and coupling nut. To engage the locking clip, the coupling nut face is moved axially towards the fitting face. To disengage the locking clip, the clip faces are forced towards each other and the coupling nut face is moved axially away from the fitting face to free the coupling nut from the clip. For multi-point nuts, a unidirectional clutch is coined in one face, the coupling nut riding over the clip face and depressing it during installation.

The present invention thus provides a flexible anti-rotation locking device preferably made from a metal and inexpensively fabricated, which can be easily retrofitted into existing installations without requiring any modification to the components and which prevents separation of two mating components, such as a coupling nut from a fluid line.

DESCRIPTION OF THE DRAWINGS

For a better understanding of the invention as well as other objects and further features thereof, reference is made to the following description which is to read in conjunction with the accompanying drawing wherein.

DETAILED DESCRIPTION OF THE INVENTION

Figure 2:
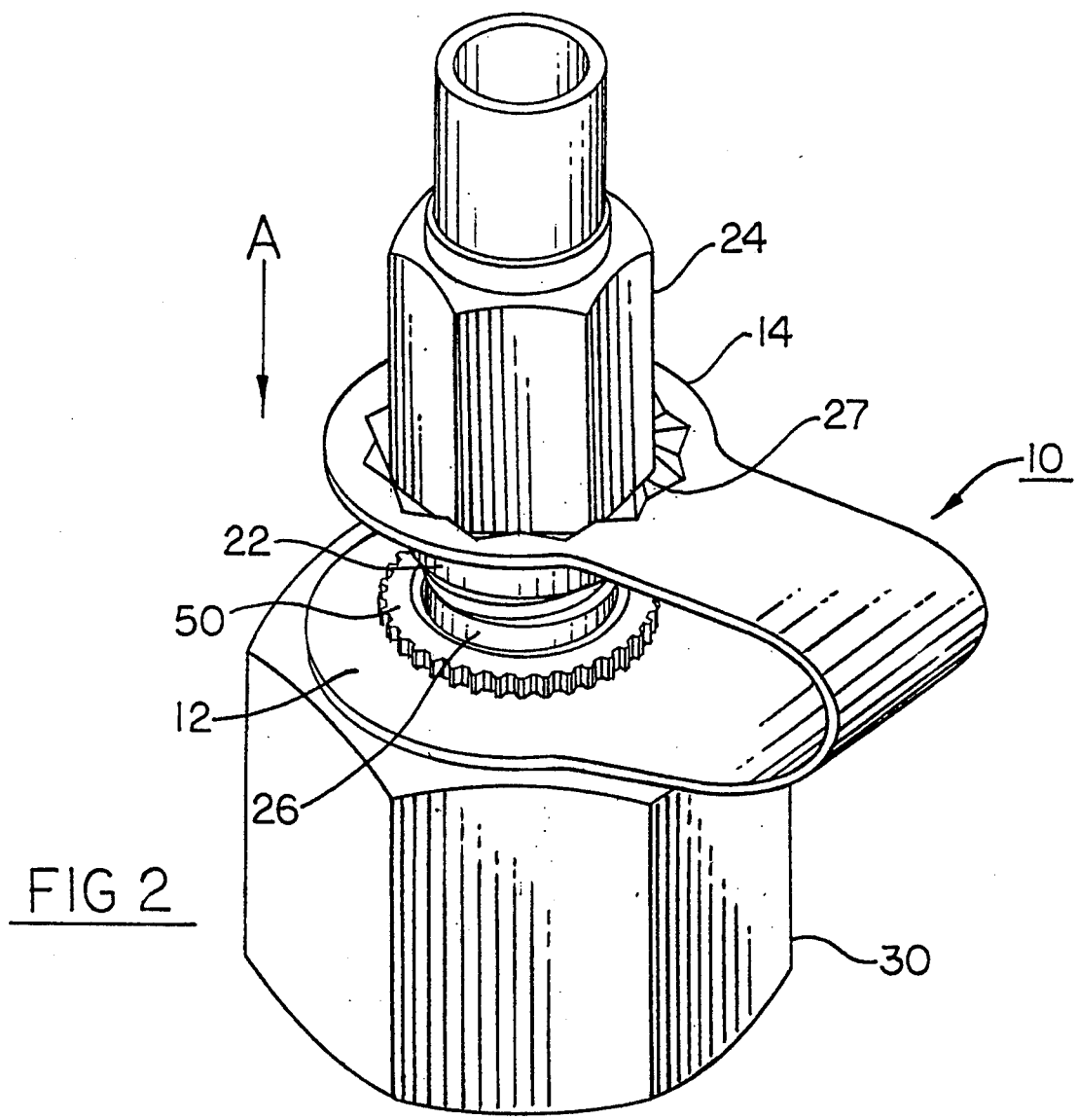
FIG. 2 is a view illustrating the device of FIG. 1 installed in a fluid adapter.
Figure 1:
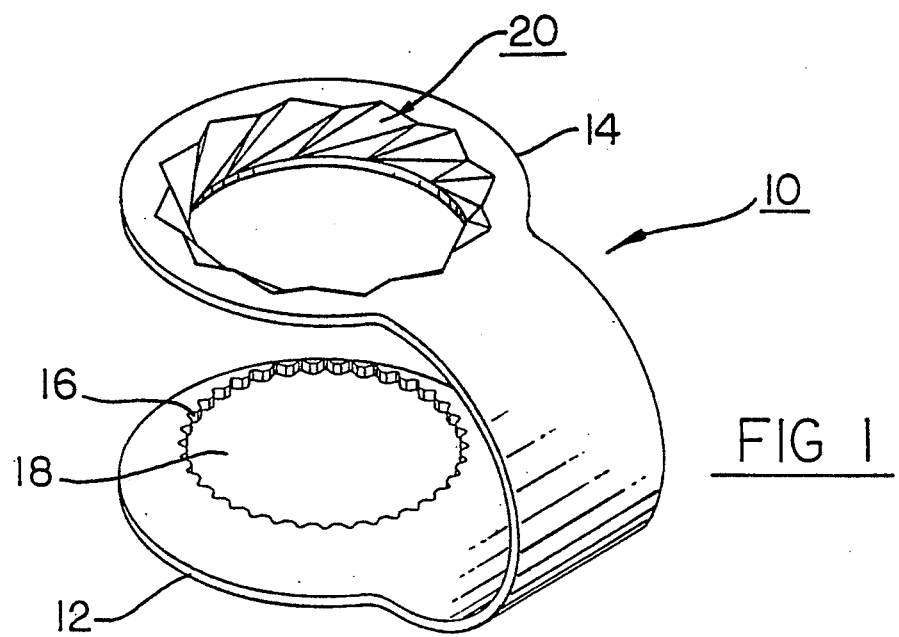
FIG. 1 is a perspective view of the device of the present invention adapted for use with fluid adapters.
Figure 4:
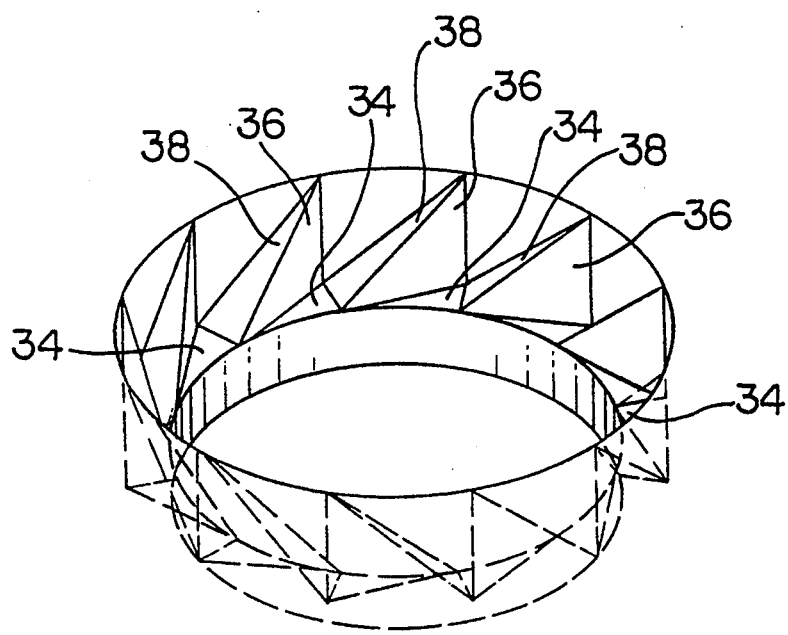
FIG. 4 illustrates the formation of a clutch face using the punch and die shown in FIGS. 3A and 3B.

Referring now to FIGS. 1 and 2, a preferred embodiment of the anti-rotation locking device 10 of the present invention is illustrated. Device 10 comprises a U-shaped spring clip having a first arm 12 and a second arm 14. A serrated surface 16 is formed, or coined, into the internal diameter of aperture 18 formed in first arm member 12. A shaped surface 20 is formed in the facing second arm member 14 as illustrated. Specifically, the surface 20 is formed to fit over the pilot portion 22 of a B-nut 24 and to allow the B-nut to be rotated in the clockwise direction to engage the threads on the fluid fitting or adapter 26. However, surface 20 prevents the fitting from rotating in the counterclockwise direction while it is in contact with the lower surface 27 of B-nut 24. In essence, the formed surface 20 functions as a unidirectional clutch. The clutch surface geometry, shown in more detail in FIG. 4, is formed by using the punch 30 and die 32 combination shown in FIGS. 3A and 3B, respectively (note that the figures illustrate a twelve point clutch for use with a hexagonal shaped fitting—the number of clutch points can be multiples of the hexagon shape, i.e. six, eighteen or twenty-four). The three faces formed by the punch provide the following functions: The horizontal faces 34 retain the clutch beneath the coupling nut, the vertical faces 36 prevent counter-clockwise rotation of the coupling nut and the 45 degree ramping surface 38 depresses arm 14 during clockwise rotation and allows for the unidirectional rotation.

Figure 3A:
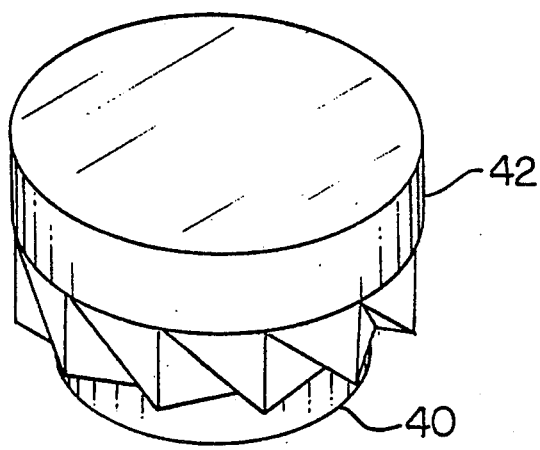
FIGS. 3A and 3B illustrate the punch and die, respectively, utilized to form a clutch face.

The punch shape shown in FIG. 3A consists of two coaxial cylinders 40 and 42. The smaller cylinder 40, the pilot cylinder, is 2% larger in diameter than the distance across the flats of the nut size and fits a prepunched hole in the clip blank. This coupling aligns the blank for forming the clutch. Cylinder 42 is 27% larger than the across flats coupling nut size, the intersections of this cylinder and two planes defining the geometry of one of the twelve clutch teeth. The first plane is tangent to the pilot cylinder. The second plane is perpendicular to the first, inclined 45 degrees and passes through the center of the intersection of the two cylinders. This geometry is rotated 30 degrees incrementally for a total of eleven times which forms the clutch shape.

Figure 3B:
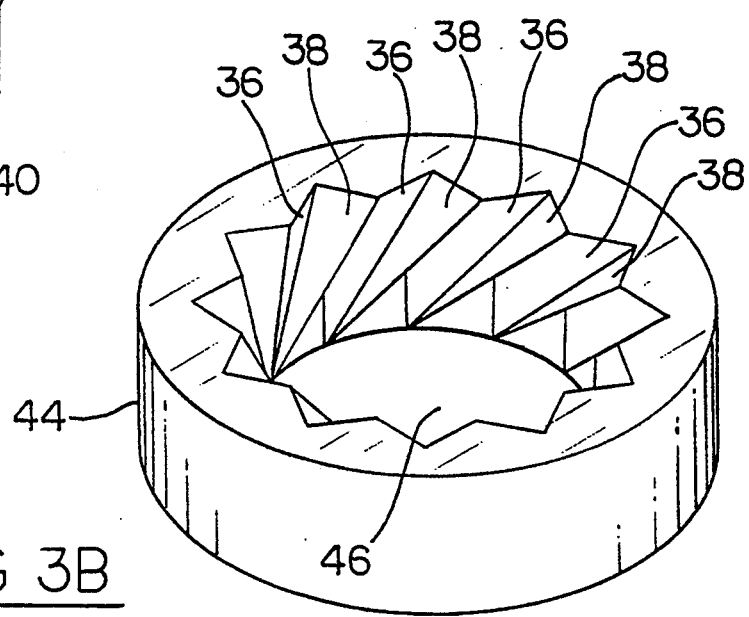

The die shape shown in FIG. 3B consists of a cylinder 44 with a concentric hole 46 therein. The cylinder 44 is 25% larger than the major diameter of the clutch face. The hole is 4% larger than the across flat nut size. The geometry of the planes is the same as for the punch with the exception that the tangent planes will be tangent to an imaginary cylinder 3% larger than the across flats dimension of the nut. All three cylinders share the same axis. The intersections of these planes with the upper surface of the die is such as to form a twelve point star the same diameter of the clip blank, 45% larger than the across flats dimension of the nut.

In use, before the B-nut 24 is threaded onto the fluid adapter, arm 12 is positioned against the lower surface of parent material (pump or housing) 30 such that serrations 16 engage the serrations formed on lock ring 50 in a manner to prevent the rotation of arm 12. The pilot portion 22 of B-nut 24 is inserted through the hole in surface 20 in a manner such that the lower edges 27 of B-nut 24 abut against retention surfaces 34 of the clutch surface (note that device 10 can be installed in the reverse order). B-nut 24 is then rotated in the clockwise direction, whereby it is threadably engaged on the threaded portion of fluid fitting 26. In this phase, ramping surfaces 38 force the contacting surfaces of B-nut 24 and device 10 apart, allowing B-nut 24 to be rotated in the clockwise direction. The spring tension of device 10 maintains the retention surfaces in contact with the adjacent surfaces of B-nut 24 and enables this ramping operation to occur.

This operation continues until threading no longer occurs. The vertical and tangent surfaces 36 prevent the B-nut 24 from rotating in the counter clockwise direction and this combination of the serrations 16 engaged with the serrations in the lock ring 50 and the clutch surface 20 prevents relative rotation between the B-nut 24 and the fluid fitting 26. In order to enable the B-nut 24 to be removed from the fluid fitting 26, flexible arm 14 is moved in the direction of arrow A away from the contacting surfaces of the B-nut and the B-nut is then rotated in the counter clockwise direction until the parts are separated.

It also should be noted that although the preferred configuration of device 10 has a single clutching surface, it can be designed to have clutching surfaces on both arms of the spring clip. The specific configuration used is obviously dependent upon the geometry of the two parts being joined.

Figure 6:
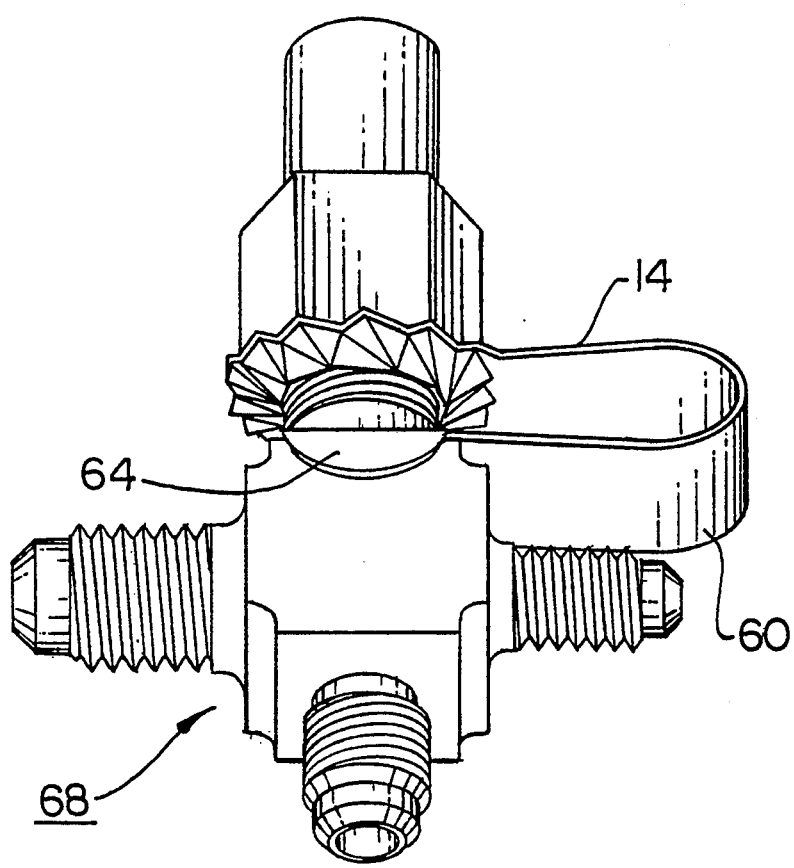
FIG. 6 is a view illustrating the device of FIG. 5 installed in a union.
Figure 5:
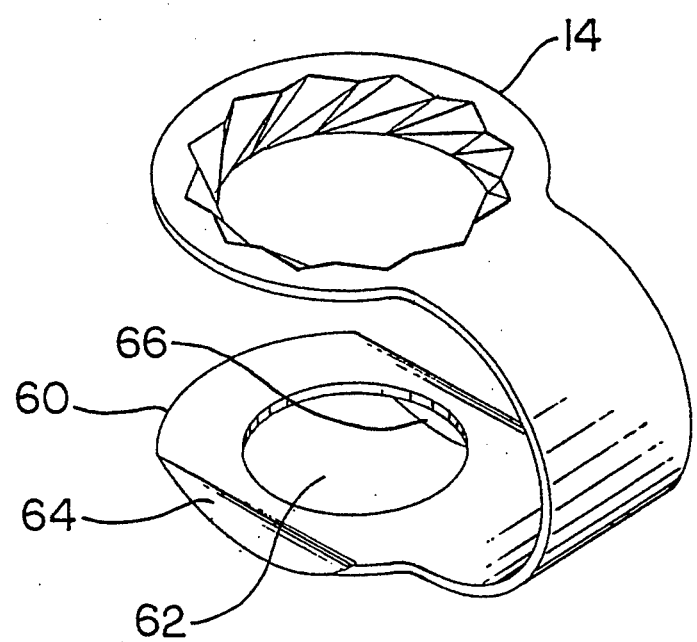
FIG. 5 is a perspective view of the device of the present invention adapted for use with unions, x's, tees and similar devices.

FIGS. 5 and 6 illustrate another embodiment of the locking device of the present invention wherein the serrations formed in arm 12 of the FIG. 1 embodiment is replaced with the configuration shown. In particular, opposite arm 60 comprises an aperture 62 formed in a metal blank, two edges of which are bent to form tabs 64 and 66. The locking device is shown installed on the x-union device 68 shown in FIG. 6.

Figure 8:
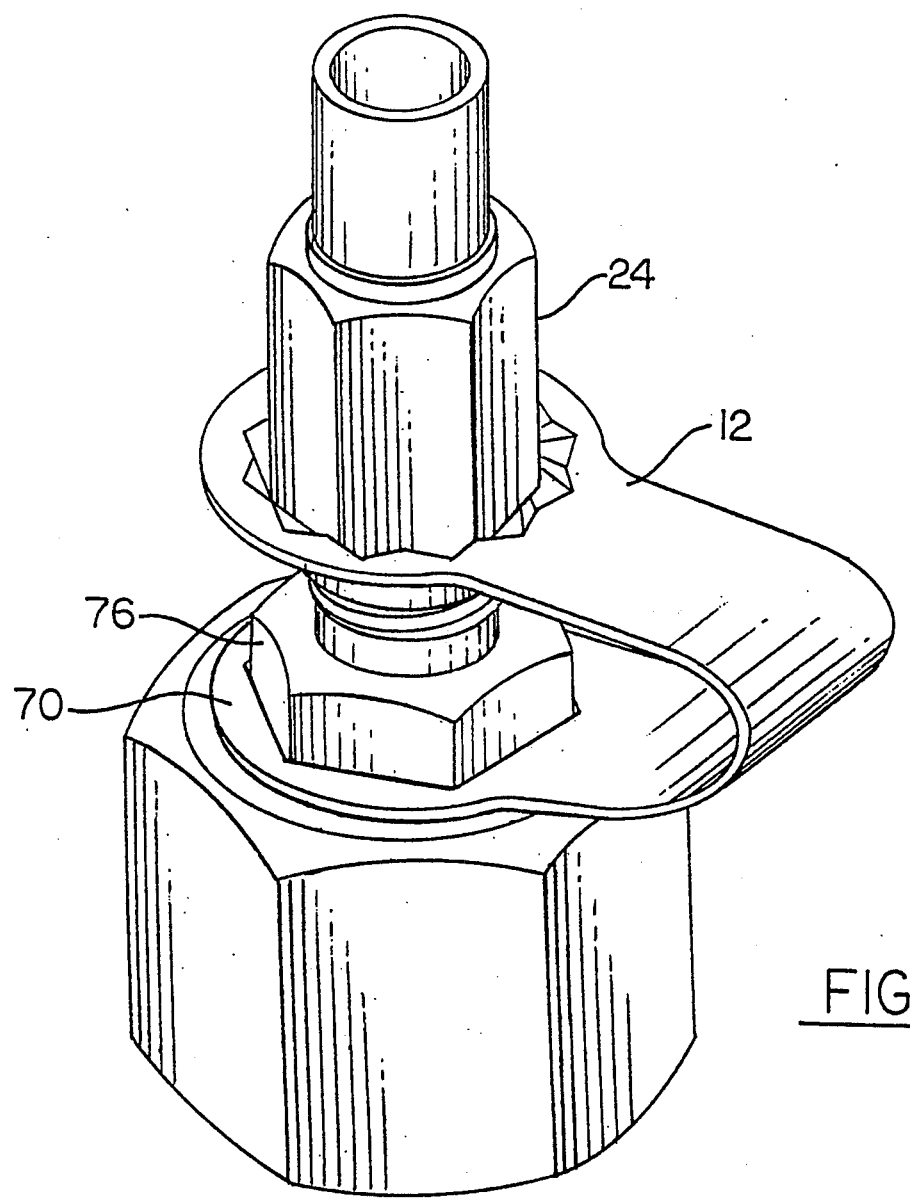
FIG. 8 is a view illustrating the device of FIG. 7 installed in an MS fitting.
Figure 7:
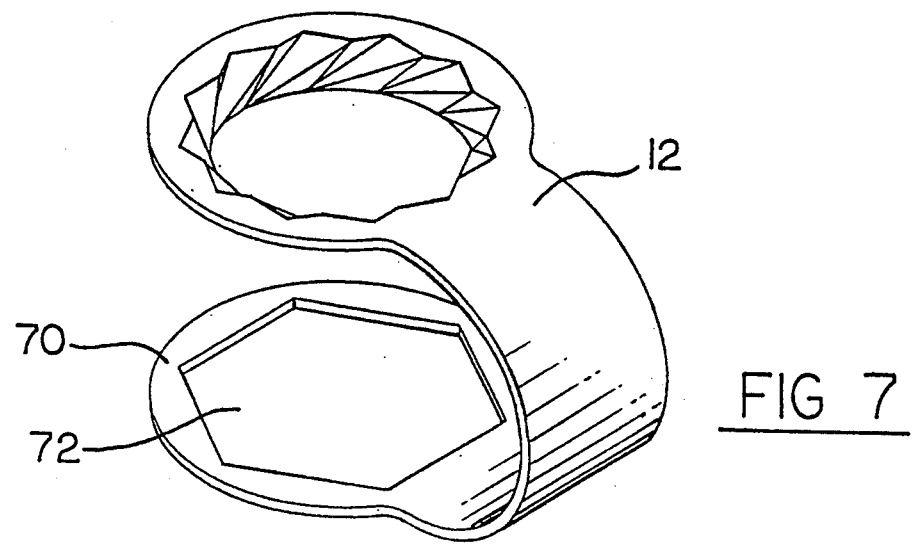
FIG. 7 is a perspective view of the device of the present invention adapted for use with standard MS fittings and similar devices.

FIGS. 7 and 8 illustrate another embodiment of the locking device of the present invention wherein the serrations formed in arm 12 of the FIG. 1 embodiment is replaced with configuration illustrated. In particular, a hex shaped aperture 72 is formed in opposite arm 70, the locking device being installed on the MS fitting shown in FIG. 8. Specifically, arm 70 is positioned over hex nut 76 to provide the anti-rotation feature of arm 70 while arm 12, with clutch surface 20, engages B-nut 24 in the same manner described with reference to FIG. 2.

Figure 10:
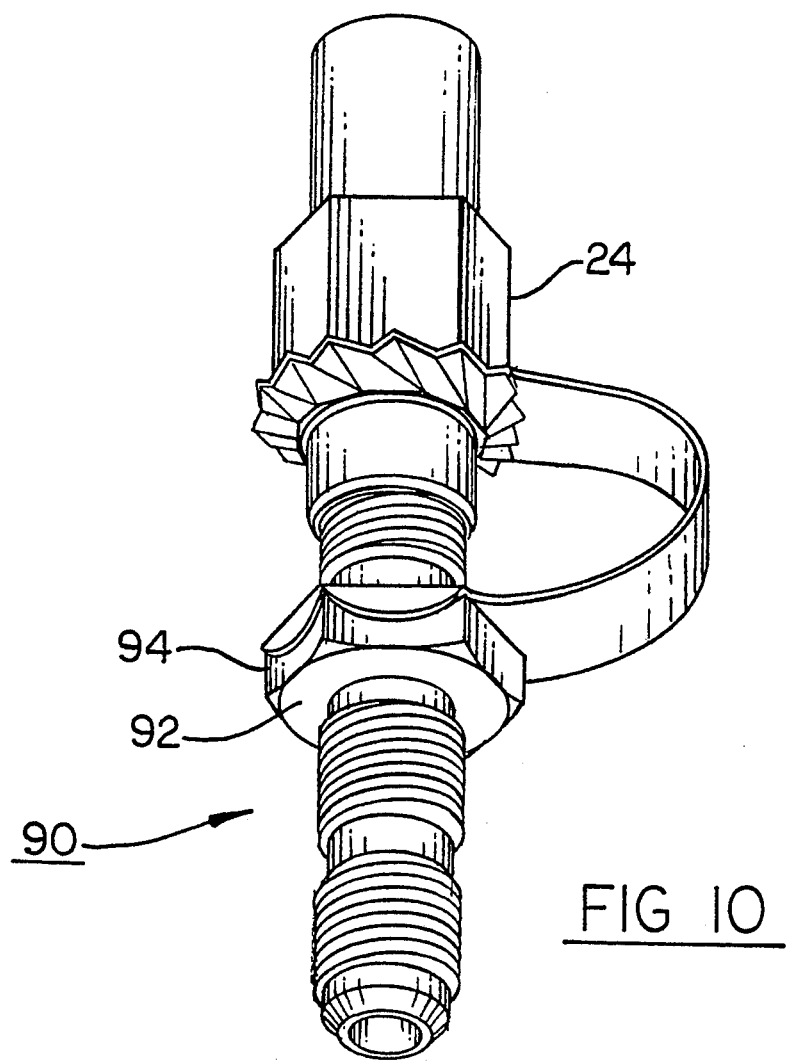
FIG. 10 is a view illustrating the device of FIG. 9 installed.
Figure 9:
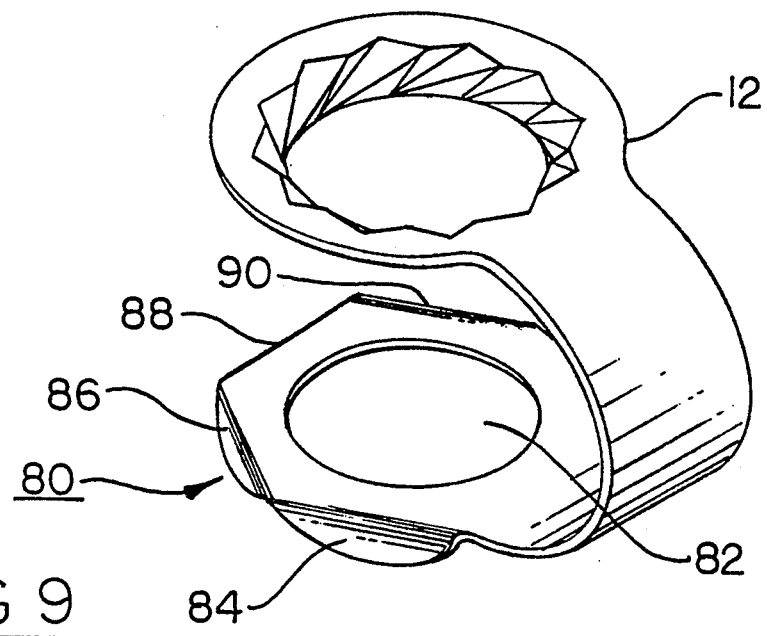
FIG. 9 is a perspective view of the device of the present invention adapted for use with a MS coupler.

FIGS. 9 and 10 illustrate another embodiment of the locking device of the present invention wherein the serrations formed in arm 12 of the FIG. 1 embodiment is replaced with the configuration illustrated. In particular, opposite arm 80 comprises an aperture 82 formed in a metal blank, at least four edges of which are bent to form tabs 84, 86, 88 and 90. The locking device is shown installed on a MS coupler 90 shown in FIG. 10, the tabs engaging the flats of the hexagonal section 94 of coupler 90 as shown. Arm 12 with clutch surface 20, engages B-nut 24 in the same manner as described with reference to FIG. 2.

Figure 12:
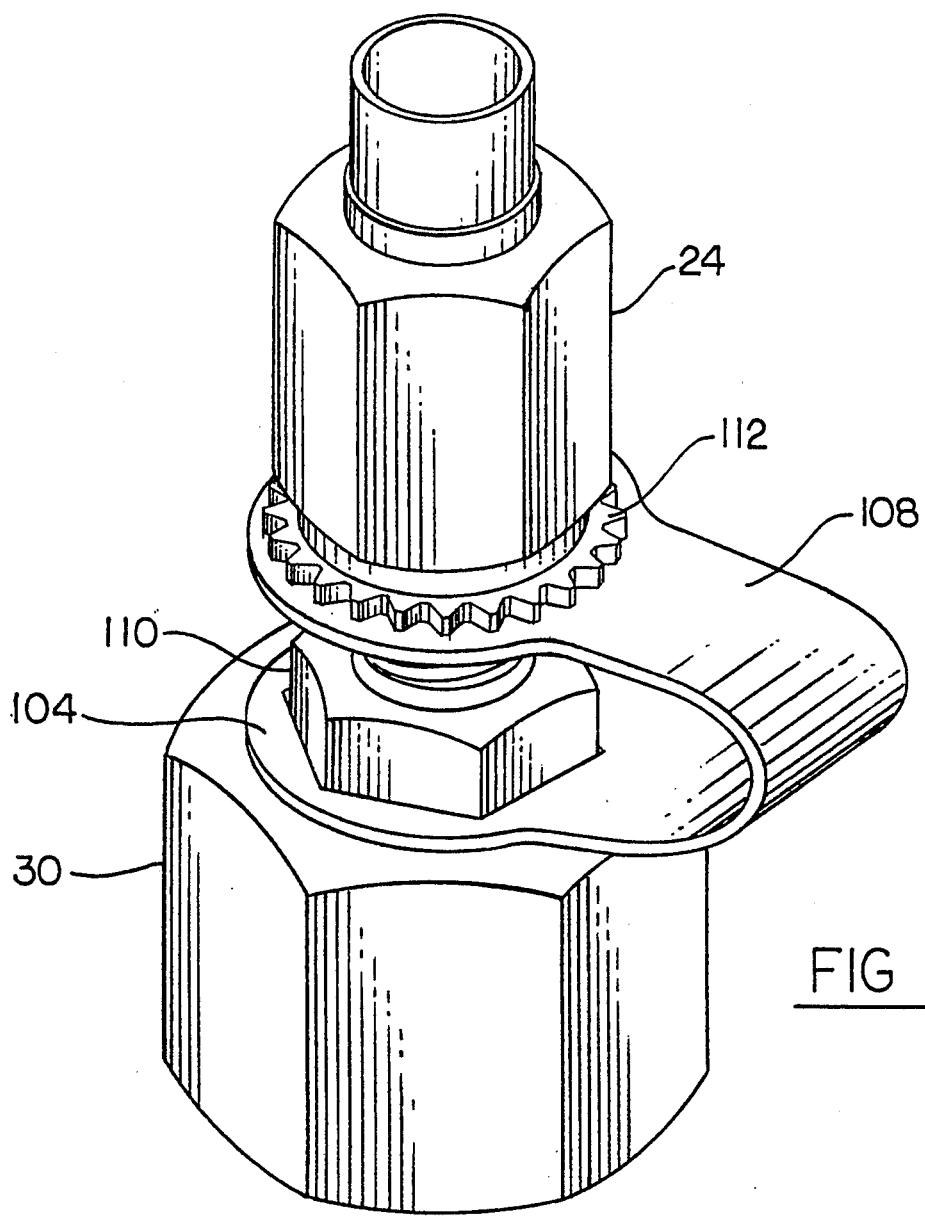
FIG. 12 is a view illustrating the device of FIG. 11 installed.
Figure 11:
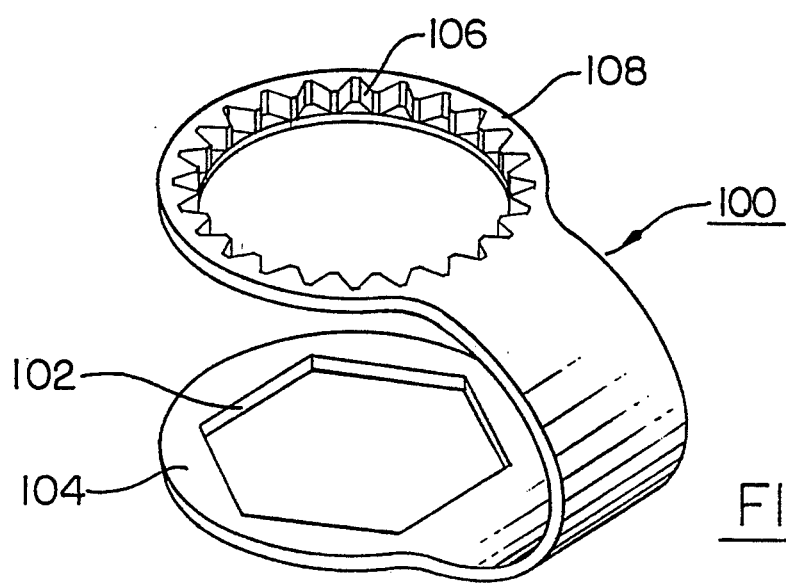
FIG. 11 illustrates a serrated nut face design in place of the clutch face.

In each of the four embodiments described hereinabove, one of the arms included clutch face 20. As noted previously, certain fittings require the use of two clutch faces. In any event, the use of at least one clutch face is considered a key feature of the present invention. Nevertheless, the concept of using a U-shaped spring clip having coined faces in opposing arms can also be implemented in those joining configurations which do not require a clutch face. In particular, FIG. 11 illustrates a spring clip 100 having a hex shaped aperture 102 formed in arm 104 and a serrated nut shape 106 formed in arm 108. FIG. 12 illustrates spring clip 100 installed in a device which has a MS fitting 110 installed into parent material 30, aperture 102 of spring clip 100 positioned therearound, serrations 106 on arm 108 engaging the serrations formed on nut 112.

Figure 14:
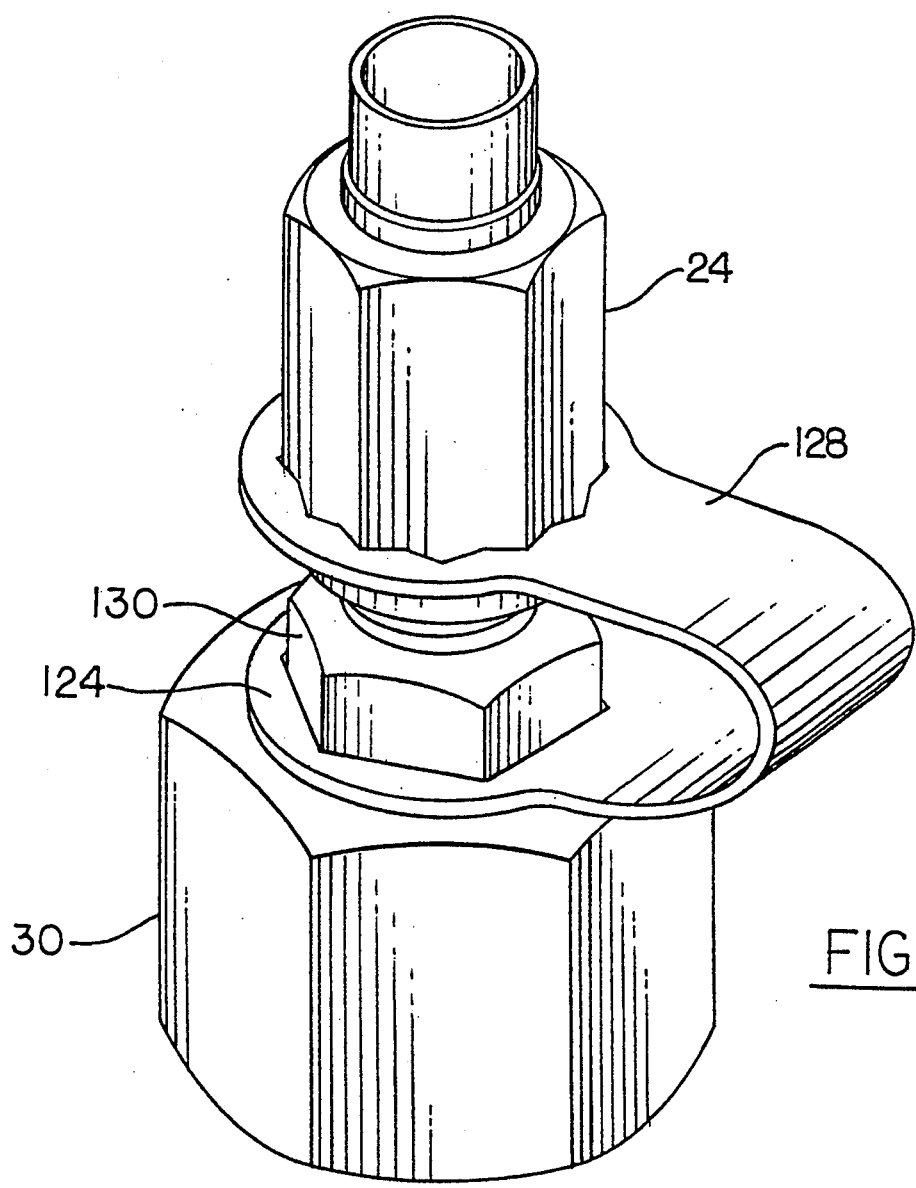
FIG. 14 is a view illustrating the device of FIG. 13 installed.
Figure 13:
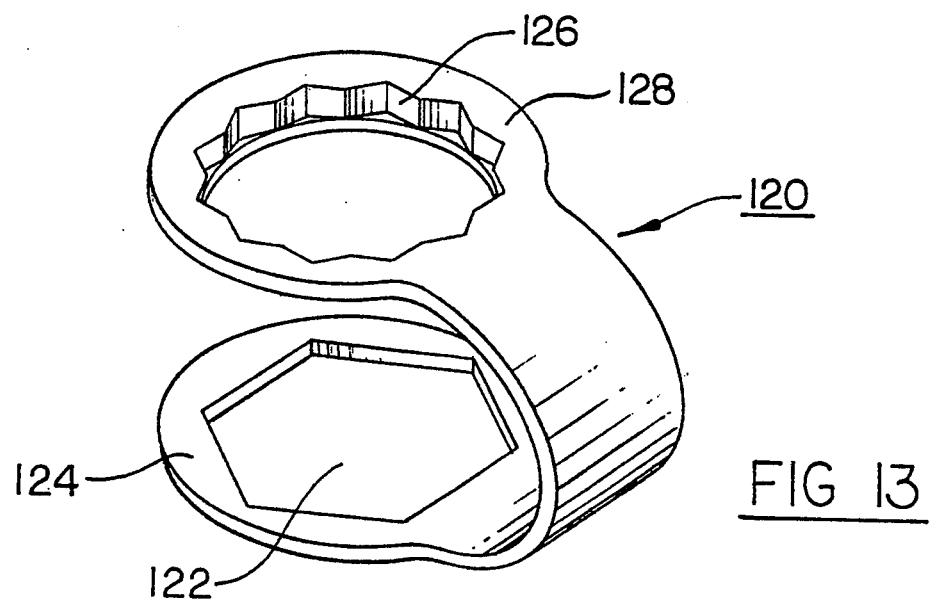
FIG. 13 is a perspective view of a 12-point face design for hex nuts.

FIG. 13 illustrates a spring clip 120 having a hex shaped aperture 122 formed in arm 124 and a 12-point shape 126 formed in arm 128. FIG. 14 illustrates spring clip 120 installed on a MS fitting 130 mounted to parent material 30, aperture 122 of spring clip 120 positioned therearound, the 12-point shape on arm 128 engaging the external hex surface of B-nut 24.

The present invention thus provides a simple and relatively inexpensive device for presenting two joined components from rotating and then separating, and particularly adapted for preventing coupling nuts separating from fluid lines.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A device for preventing first and second joined parts from separating, comprising a resilient U-shaped member, a first arm of the member terminating in a shaped portion with an aperture formed therein defining an apertured end portion, a surface being coined along the internal surface of said aperture to engage a corresponding surface formed on said first joined part, a second arm of said member terminating in a shaped portion with an aperture formed therein defining an apertured end portion, a surface being coined along the internal surface of said aperture in said second arm to engage a corresponding surface formed on said second joined part, said apertured end portion in said first arm member being substantially coaligned with said apertured end portion in said second arm member, the apertured end portions being shaped to engage the joined parts such that the joined parts will not rotate relative to each other.

2. The device of claim 1 wherein the surface coined in the aperture in said second arm forms a unidirectional clutch.

3. The device of claim 2 wherein the surface of the aperture formed in said apertured end portion of said first arm is serrated.

4. The device of claim 3 wherein said apertured end portion in said first arm comprises an upwardly inclined shaped member having a lower base portion and an upper surface portion, the surface of said aperture being formed in said upper surface portion.

5. The device of claim 2 wherein said unidirectional clutch surface comprises three face portions, the first face portion retaining the first arm beneath a surface of said first joined part, the second face portion preventing rotation of said first joined part in a first direction and the third face portion allowing said first joined part to rotate in a second direction.

6. The device of claim 5 wherein said first face portion comprises a plurality of horizontally extending surfaces, said second face portion comprises a plurality of vertically extending surfaces and said third face portion comprises a plurality of inclined surfaces.

7. The device of claim 6 wherein said first direction is counter-clockwise and said second direction is clockwise.

8. The device of claim 1 wherein said apertured end portion of said first arm includes a shaped tab formed below the aperture.

9. The device of claim 1 wherein the surface of said apertured end portion of said first arm has a hexagonal shape.

10. A fluid connector and lock combination for connecting a tube to a base element that includes a fitting that is threaded into a parent material and includes a passageway for passing fluid, the combination comprising:

a lockring having external serrations that engages the parent material and the fitting through mutual serrations to fix the fitting relative to the parent material;

a B-nut that circumferentially mounts the tube to the fitting through threaded engagement with the fitting; and a U-shaped spring member, a first arm of the spring member terminating in a shaped portion with an aperture formed therein, a uni-directional clutch being coined in the aperture surface, a second arm of said spring member terminating in a shaped portion having an aperture formed therein, the surface thereof being serrated, the serrations of said U-shaped member engaging the external serrations formed on said locking, said unidirectional clutch coacting with said B-nut.

* * * * *